United States Patent

Pudney et al.

[11] Patent Number: 5,205,453
[45] Date of Patent: Apr. 27, 1993

[54] LOCKING MECHANISM FOR AUTOMOBILE LUGGAGE RACKS

[75] Inventors: Richard I. Pudney, Croswell; Charles R. Schriner, Port Huron; Charles E. Stringer, Deckerville; Mark C. Towns; Gary M. Cronce, both of Port Huron, all of Mich.

[73] Assignee: Masco Industries, Inc., Taylor, Mich.

[21] Appl. No.: 561,696

[22] Filed: Aug. 1, 1990

[51] Int. Cl.⁵ .................................................. B60R 9/00
[52] U.S. Cl. ..................................... 224/321; 224/326
[58] Field of Search ............... 224/326, 325, 309, 324, 224/321; 74/110, 538, 527, 529; 200/551, 533, 573, 574

[56] References Cited

U.S. PATENT DOCUMENTS

| Re. 26,309 | 11/1967 | Heard . | |
|---|---|---|---|
| Re. 26,538 | 3/1969 | Bott . | |
| Re. 26,539 | 3/1969 | Bott . | |
| Re. 32,706 | 7/1988 | Bott . | |
| 725,577 | 4/1903 | Miller | 74/110 |
| 2,121,531 | 6/1938 | Murphy | 74/110 |
| 3,227,102 | 1/1966 | Shook . | |
| 3,554,416 | 1/1971 | Bott . | |
| 3,721,200 | 4/1973 | Schmidt . | |
| 3,774,939 | 11/1973 | Freads et al. . | |
| 3,782,295 | 1/1974 | Balinski . | |
| 3,912,894 | 10/1975 | Mullen et al. | 200/533 |
| 3,952,671 | 4/1976 | Val Verde . | |
| 4,132,335 | 1/1979 | Ingram . | |
| 4,225,068 | 9/1980 | Ingram . | |
| 4,239,138 | 12/1980 | Kowalski . | |
| 4,244,501 | 1/1981 | Ingram . | |
| 4,279,368 | 7/1981 | Kowalski . | |
| 4,372,469 | 2/1983 | Kowalski et al. . | |
| 4,406,386 | 9/1983 | Rasor et al. . | |
| 4,448,337 | 5/1984 | Cronce . | |
| 4,469,261 | 9/1984 | Stapleton . | |
| 4,516,710 | 5/1985 | Bott . | |
| 4,616,772 | 10/1986 | Mareydt . | |
| 4,650,383 | 3/1987 | Hoff . | |
| 4,684,048 | 8/1987 | Bott . | |
| 4,754,905 | 7/1988 | Bott . | |
| 4,899,917 | 2/1990 | Bott . | |
| 4,967,945 | 11/1990 | Bott . | |
| 4,982,886 | 1/1991 | Cucheran | 224/321 |
| 5,007,570 | 4/1991 | Himmel | 224/321 |
| 5,010,780 | 4/1991 | Hatfield | 74/538 |
| 5,082,158 | 1/1992 | Bott . | |

FOREIGN PATENT DOCUMENTS 672749 10/1964 Italy .

Primary Examiner—Linda J. Sholl
Attorney, Agent, or Firm—Leydig, Voit & Mayer

[57] ABSTRACT

An article securing member for an automobile luggage rack is provided with a spring biased retractable lock pin which can selectively engage a plurality of longitudinally spaced apertures formed in the side rail of the rack. A push button is provided for actuating a lever link which lifts the retractable lock pin against the spring bias when the button is depressed to disengage the lock pin from the apertures and permit sliding movement of the article securing member along the side rail.

32 Claims, 4 Drawing Sheets

LOCKING MECHANISM FOR AUTOMOBILE LUGGAGE RACKS

FIELD OF THE INVENTION

The present invention relates generally to article carriers or luggage racks for mounting on an exterior body surface of automotive vehicles and the like and is more particularly directed to a locking mechanism for a movable article securing member such as a stanchion therefor.

RELATED APPLICATIONS

This application discloses an article carrier in the form of a luggage rack for automotive vehicles of the same general type as disclosed in copending Mandarino et al. U.S. application Ser. No. 250,705, filed Sep. 28, 1988, now abandoned. The invention herein relates to an improvement in the locking mechanism for a movable article securing member, stanchion or tie down element such as disclosed in that application.

BACKGROUND OF THE INVENTION

Racks for carrying luggage and other articles on an exterior surface of automobile vehicles and the like have become quite popular. Typically, such racks and carriers are mounted on the vehicle roof or rear trunk lid, although other surfaces are sometimes used, such as the upper surface of a cap or canopy for a pick-up truck.

There are many prior art patents on such luggage racks and article carriers. One general type rack employs raised side rails mounted substantially above the surface of the vehicle on fixed stanchions with relatively flat intermediate skid strips or load supporting slats therebetween. Bott Re. 26,538 and Re. 26,539 are examples of expired patents of this kind. Ingram U.S. Pat. No. 4,225,068; Kowalski U.S. Pat. Nos. 4,239,138 and 4,279,368 and Mareydt U.S. Pat. No. 4,616,772 are more recent examples disclosing luggage racks and carriers of this general type. Because the side rails are elevated above the roof surface, they create undesirable wind resistance and noise and because they are unsupported between the stanchions, their load carrying capacity is somewhat limited.

Another general type of rack or carrier that has met with some commercial acceptance employs relatively flat, low-profile slats along the sides on which stanchions connected to cross bars or article tie down members are mounted. Bott U.S. Pat. No. 4,516,710 and Re. 32,706 along with their issued parent patents and many of the numerous references cited therein are illustrative of this style rack. Other U.S. Pat. Nos. disclosing racks and carriers of this type are: Ingram 4,132,335 and 4,244,501; Kowalski et al. 4,372,469; Rasor et al. 4,406,386; Cronce 4,448,337; Stapleton et al. 4,469,261 and many of the references cited in these patents. The side slats disclosed in these patents are generally characterized as being substantially wider than they are high and have a substantially flat, horizontal upper article carrying surface.

For use with vehicles having roof surfaces with a more rounded contour, Bott U.S. Pat. Nos. 4,684,048 and 4,754,905 disclose carriers having supporting side slats with non-horizontal lower mounting surfaces and upwardly opening channels for receiving generally horizontally disposed liners with flat inwardly directed flanges for supporting articles and movable stanchions connected to cross bars.

More recently, luggage racks have been designed wherein the side rails are supported on the exterior surface of the vehicle but the rails are higher than they are wide and are provided with a decorative trim strip on the outboard side of the rail to present a streamlined aerodynamic and aesthetically pleasing appearance. Such a luggage rack is disclosed in the above-mentioned copending Mandarino et al. U.S. patent application Ser. No. 250,705 which also discloses article securing members in the form of crossbar stanchions or tie down elements that are longitudinally movable along the side rails and selectively locked in place at predetermined intermittent locations by a pushbutton lock pin mechanism that engages spaced apart apertures formed along the length of the rails. As disclosed in that application, the push button is formed with a sloping cam surface that engages a complementally angled cam follower that lifts a spring biased locking pin out of engagement with one of the apertures in the side rail. While this arrangement is generally satisfactory, the friction caused by the angled cam faces as well as foreign material such as dirt, ice and water on the cam surfaces sometimes causes the button to bind making it difficult to depress in order to lift the lock pin or to properly release the button under the bias of the spring to reinsert the lock pin in another aperture in the side rail.

OBJECTS AND SUMMARY OF THE INVENTION

Accordingly, it is the primary aim of the present invention to provide an improved lock pin lifting mechanism for a push button actuated article securing device that is easy to operate, reliable in use and substantially free from adverse effects of dirt, other foreign material and inclement weather conditions.

It is a more detailed object to provide such a lock pin lifting mechanism that is mechanically simple, being based on a lever or toggle-like action, and yet positive in operation. Another and related object is to provide a lock pin lifting mechanism of the foregoing type which is relatively inexpensive to manufacture and assemble but is essentially trouble-free and long lasting in use.

In keeping with the invention, the article securing member includes a retractable lock pin carried therein which can engage a plurality of oblong apertures formed in the side rail at intermittent locations along the length thereof, each aperture being dimensioned and disposed to receive the tip portion of the retractable lock pin. Preferably, a push button is provided for engaging a toggle or lever link which lifts the retractable lock pin when the button is depressed. A spring is provided for normally biasing the push button into a position substantially flush with the outer surface of the article securing member and for urging the retractable pin into a locked position.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 1 is a perspective view of an article carrier showing the article securing members of the present invention installed on the upper exterior body surface of an automobile vehicle or the like;

While the invention will be described and disclosed in connection with certain preferred embodiments and procedures, it is not intended to limit the invention to those specific embodiments. Rather it is intended to cover all such alternative embodiments and modifications as fall within the spirit and scope of the appended claims.

DETAILED DESCRIPTION OF THE PREFERRED EMBODIMENTS

Figure 1:
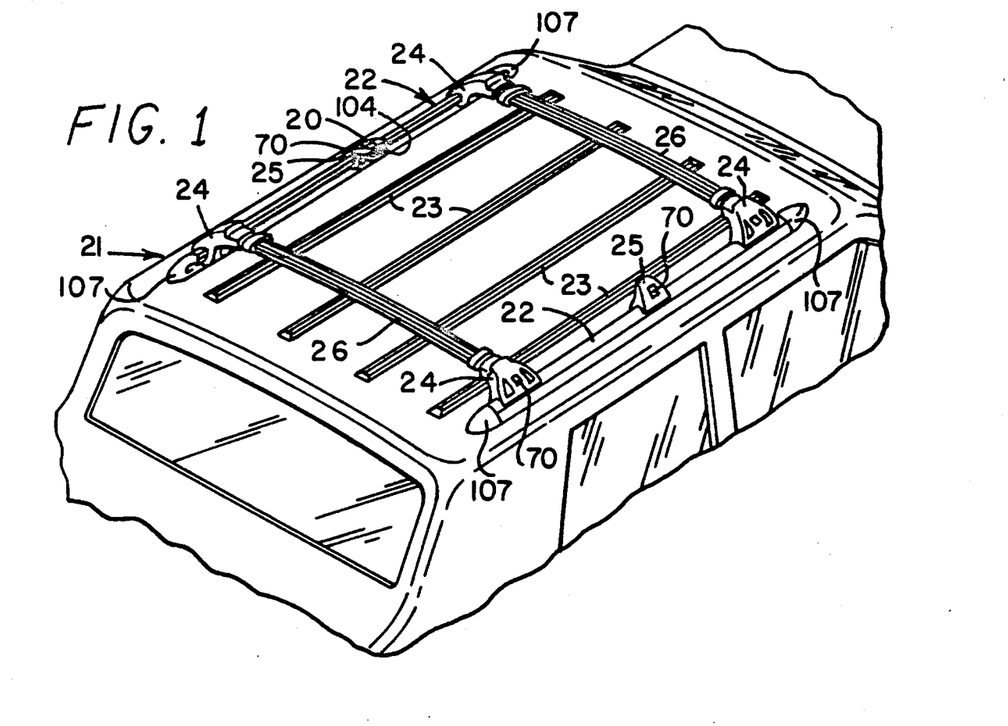

Turning now to the drawings, there is shown in FIG. 1 an article carrier or luggage rack 20 of the present invention mounted on the exterior body surface 21 of an automobile vehicle or the like. In the embodiment illustrated in FIG. 1, the carrier 20 is shown mounted on the roof portion of the vehicle, but it should be understood that the carrier 20 of the present invention can also be mounted on other suitable exterior vehicle surfaces such as a trunk lid, for example.

The article carrier 20 includes a pair of elongated side rails 22 which are adapted to be mounted on the vehicle body surface 21 in spaced-apart parallel relation with respect to the longitudinal center line of the surface 21. As shown in FIG. 1, a plurality of elongated skid strips 23 are adapted to be mounted in spaced-apart parallel relation intermediate the side rails 22. It will be understood that the skid strips 23 are adapted to provide not only direct support for articles or luggage placed within the carrier 20, but also to protect the exterior vehicle surface 21 from being marred or scratched by such articles, luggage and the like.

Mounted on each of the side rails 22 are at least one and preferably a plurality of article securing members 24 and 25. In the preferred embodiment, the article securing members 24 are in the form of stanchions mounted on each of the side rails 22, supporting raised cross bars 26 extending bridgingly between them. As will be described in more detail hereinafter, the article securing members 25 are in the form of tie down members mounted on each of the side rails 22.

As more particularly shown in FIGS. 1A and 3-5, each of the side rails 22 is formed with an upper supporting surface 30, a lower mounting surface 31 and inboard and outboard sides 35 and 36 with respect to the center line of the vehicle surface 21. It will be understood that each elongated side rail 22 also has a substantially longitudinally extending z axis which is intersected at right angles thereto by a substantially horizontally extending x axis and a substantially vertically extending y axis.

Figure 1A:
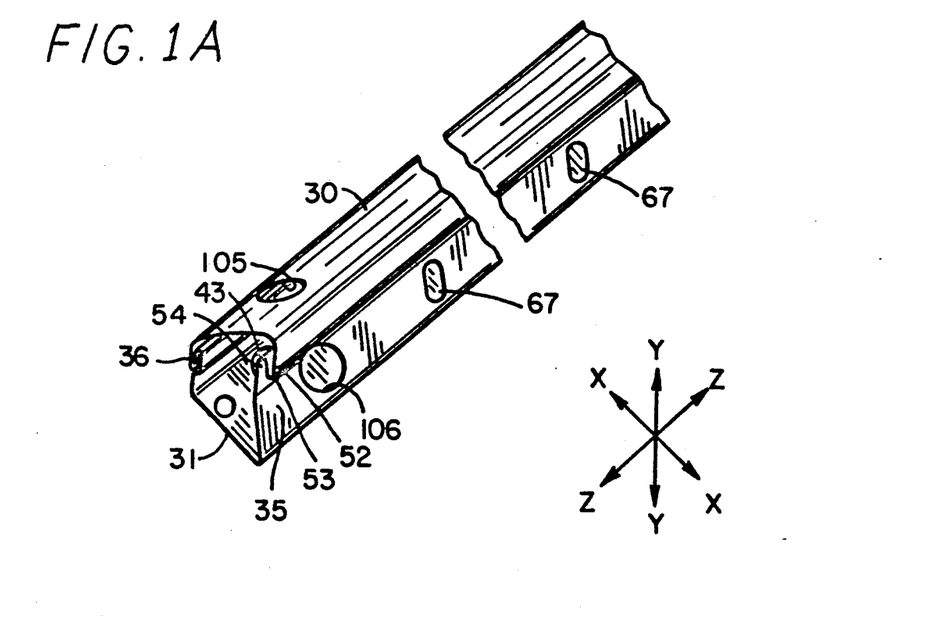
FIG. 1A is a partial perspective view of a section of an exemplary rail showing several of the intermittent apertures therein.
Figure 3:
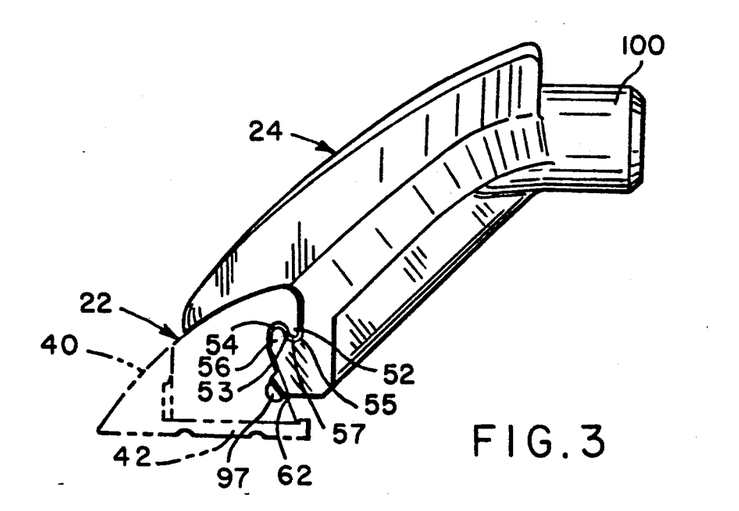
FIG. 3 is a side elevational view of the article securing member of FIG. 2.

In accordance with the preferred embodiment and as shown in the Figures and described herein, each of the side rails 22, similar to those disclosed in the above-mentioned copending application Ser. No. 250,705, is formed with a transverse cross-section having a height greater than its width and the upper surface 30 is formed with a substantial portion thereof sloping downwardly and outwardly with respect to the center line of the vehicle surface 21 and the longitudinal axis z of the side rail 22. Thus, as seen in FIGS. 1A and 3, each side rail 22 is formed with an asymmetrical transverse cross-sectional shape and it will be understood that the inboard sides 35 of the respective side rails are adapted to be mounted on the vehicle surface 21 in facing relationship with respect to the center line. It will be appreciated that by making the side rails 22 higher than they are wide, they have greater resistance to vertical bending and, therefore, greater load carrying capacity as compared to the relatively wide and flat slat-like side elements of the prior art such as disclosed in the aforementioned Bott U.S. Pat. No. 4,516,710 and other similar prior art slat-like structures.

Figures 4, 4A:
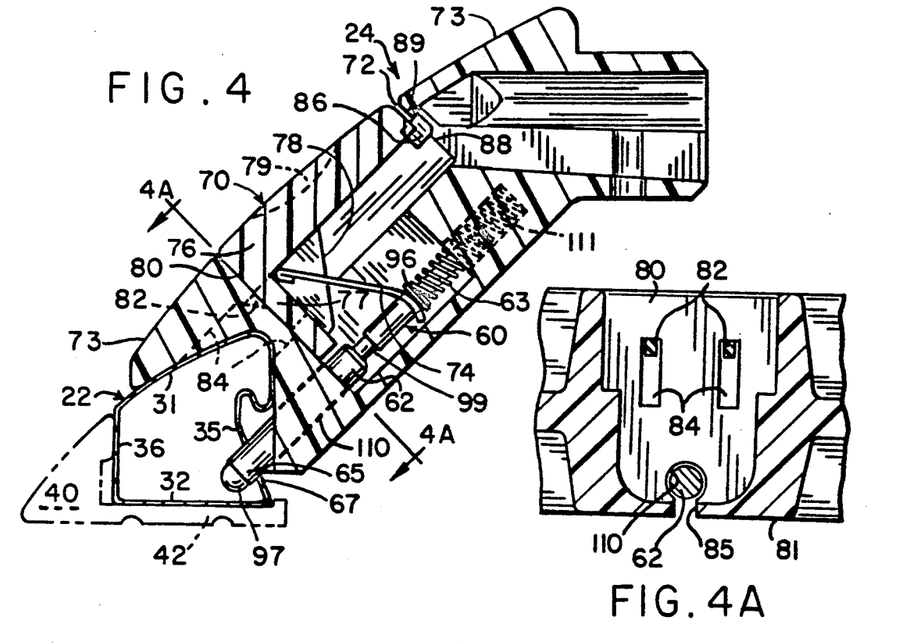
FIG. 4 is a cross sectional view of the article securing member of FIG. 2 substantially as seen along line 4—4 and showing the article securing member mounted on a side rail with the retractable locking pin in a locked position.
FIG. 4A is a cross sectional view of the article securing member of FIG. 4 substantially as seen along line 4A—4A showing the guide grooves for the pushbutton.
Figures 5, 5A:
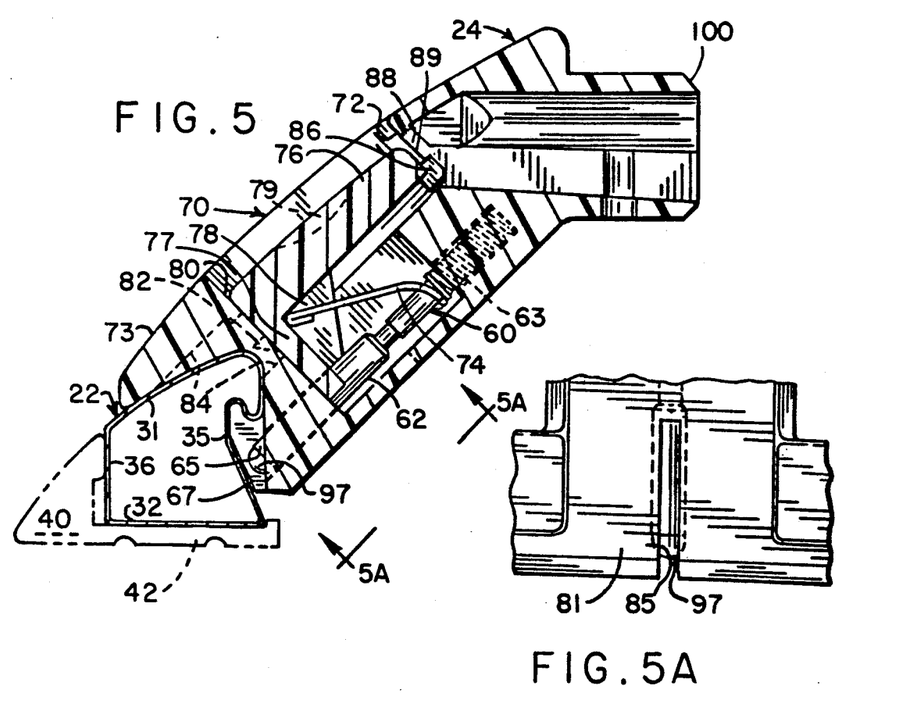
FIG. 5 is a section similar to FIG. 4 substantially as seen along line 5—5 of FIG. 2 with the retractable pin in an unlocked position.
FIG. 5A is a fragmentary bottom view of the article securing member of FIG. 5 showing the drainage slot of the present invention.

To secure the side rails 22 and an elongated combination trim molding 40 and gasket portion 42 (as shown in FIGS. 3-5) to the vehicle surface 21 (see FIG. 1), various fastening means and/or adhesive systems may be employed. Thus, for example, various contact adhesives may be directly applied to the mating surfaces of these parts for securing them together. Alternatively, in the preferred embodiment, fastening means (not shown) in the form of Torx-head screws inserted through appropriate openings 43 in the lower mounting surface 31 of the side rail 22, and the gasket portion 42 of the trim strip 40, respectively, may be threaded into Wel-Nuts or Riv-Nuts which pass through and are captured in openings in the surface of the vehicle as has become common in the automotive industry and is known to those skilled in this art.

Also in keeping with the disclosure of copending application Ser. No. 250,705 and as shown herein, the side rails 22 and article securing members 24, 25 are formed with complementally shaped engaging means for resisting rotation of the article securing members with respect to the x, y and z axes of the side rails 22 while permitting longitudinal movement thereon. In the preferred exemplary embodiment, and as illustrated in the drawings, the side rails 22 are each formed with a longitudinally extending open jaw portion 52 including a downwardly depending tongue 53 and an upwardly extending groove 54 on the inboard side 35 thereof. Similarly, the article securing members 24, 25 are preferably formed with open jaw portions 55 including upwardly extending tongue portions 56 and downwardly extending grooves 57 which interfit with the complementally-shaped jaws 52 of the side rails 22.

To lock the article securing members 24, 25 at selected positions along the side rails 22, manually operated locking means 60 are provided. In the preferred embodiment, each article securing member 24, 25 carries a retractable locking pin 62 which is biased by a spring 63 into locking position wherein the tip 65 of the pin 62 projects into one of a series of oblong apertures 67 formed in and spaced along the length of the inboard side 35 of side rail 22. For retracting the pins 62 from the apertures 67, a manual actuating mechanism in the form of a push button 70 is mounted in an opening 72 in the outboard surface 73 of each of the article securing members 24, 25.

Pursuant to the present invention, a toggle-like lever link 74 operatively connects the lock pin 62 and the push button 70 for disengaging the tip of the lock pin from the apertures 67 in the side rails 22 incident to the push button being depressed relative to the outer surface 73 of the article securing members 24, 25. In the illustrated embodiment, the push button 70 is formed with a back 76 and a foot 77 interconnected by two downwardly and inwardly inclined surfaces 78, which form side walls to constrain the longitudinal movement of the actuating lever 74 placed therebetween. As the button 70 is pushed in from the position shown in FIG. 4, for example, the push button foot 77 slides on the floor or lower deck 80 of the buttonslide opening 72 and pivots the actuating lever 74 to raise the lock pin 62 against the bias of the spring 63 to the position shown in FIG. 5. It will be understood, of course, that when the button is released, the spring 63 urges the pin 62 toward its locked position with its tip 65 inserted into one of the oblong apertures 67, provided the pin 62 and aperture 67 are in alignment. The spring 63 also biases the actuating lever 74 downwardly which urges the push button 70 back to its normal position with its generally flat outer face substantially flush with the outboard surface of the article securing member 24, 25.

Preferably, the article securing members 24, 25 are gently curved and inclined upwardly and inwardly with respect to the z axis of the side rails and have substantially smooth outer surfaces, at least in the longitudinal central portion thereof where the outer ends of the push buttons 70 are located. Thus, not only are the outer surfaces of the article securing members substantially smooth and flush to the effects of wind, snow and rain, but the internal parts of the locking means including the actuating levers 74 and locking pins 62 are essentially shielded and protected from the elements. This substantially prevents icing and freezing up of the locking means and also substantially prevents the entry of dust and dirt therein which may cause the pins 62 and push buttons 70 to stick. Preferably, the push buttons 70 are made of substantially non-sticking plastic materials such as Nylon, for example. In the illustrated embodiment the outer face of the push button 70 is provided with a shallow concave recess 79 for engagement by an operator's finger or thumb.

Additionally, in the preferred embodiment, a drainage slot 85 is provided in the underside 81 of the article securing member 24 to facilitate the draining of liquid from within button slide opening 72. This drainage slot substantially prevents the retaining of liquid within the button slide opening adjacent the locking pin 62 and actuating lever 74 which could possibly freeze up to prohibit the working of the locking means.

To guide the sliding movement of the push buttons 70 and also prevent the accidental withdrawal thereof, the underside of the push button is formed with a pair of integral triangular detents 82 that project into a pair of spaced apart guide grooves 84 formed in the lower deck 80 of the button slide opening 72 formed in the article securing members 24, 25 as seen in FIG. 4A. Similarly, a tab 86 is formed integral with the top portion of the push button 70 and projects into a guide groove 88 formed in the upper surface 89 of the push button opening 72 to prevent the accidental withdrawal of the pushbutton therefrom. To assemble the locking means 60, the following sequence is preferred. The spring 63 is mounted on the upper end of the lock pin 62 and the lower end of the pin is inserted into the lower pin receiving hole 110 in the stanchion. The spring is compressed and inserted into the upper socket 111. Thus the pin is lifted to expose the reduced diameter portion 99 and the key-hole end 95 of the lever link 74 is slipped over it and up to abut the annular shoulder 96. The radiused end 94 of the lever is lifted so the foot 77 of the button can be slid beneath it. The button 70 is then further inserted into the recess 72 with the lower lugs 82 first entering the lower slots 84 in the recess floor. The upper end of the button 70 is finally pushed in so that the upper tab 86 snaps into the upper groove 88 in the stanchion. The entire locking means is thus held captive in the slide opening 72.

Figure 6:
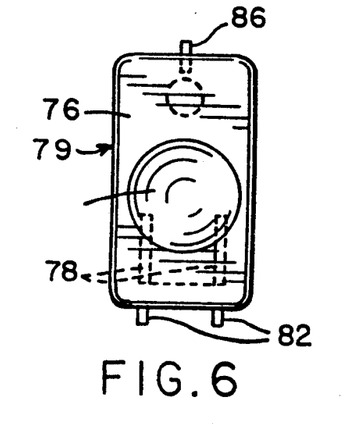
FIG. 6 is a front elevational view of the push button of the present invention.
Figure 7:
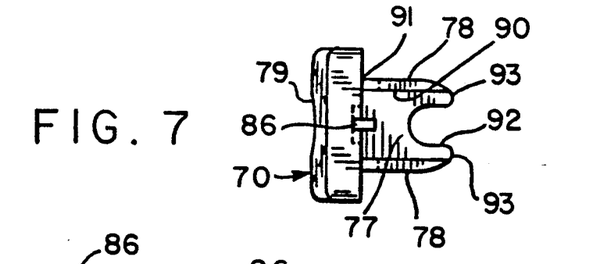
FIG. 7 is a top view, i.e., a view looking down, of the push button shown in FIG. 6.
Figure 8:
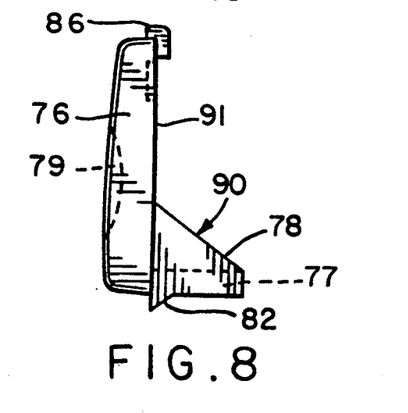
FIG. 8 is a side elevational view of the pushbutton shown in FIGS. 6 and 7.

The pushbutton 70 is shown in more detail in FIGS. 6-8. These figures show the relation of the inclined side walls 78 and the two triangular detents 82 which depend therefrom and are formed integrally therewith. The button foot 77 and side walls 78 define a channel 90 which is closed on the outboard side by the inward face 91 of the pushbutton back 76. A generally U-shaped opening 92 is formed in the inboard end of the foot 77, the jaws 93 of which surround but do not engage the locking pin 62 when the pushbutton 70 is depressed so that the locking pin can move freely in the opening 92.

Figure 9:
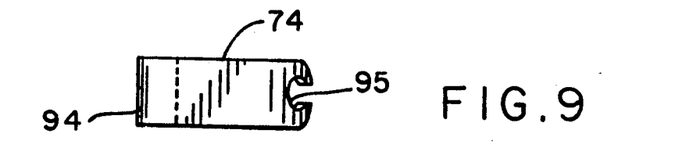
FIG. 9 is a plan view of the actuating lever of the present invention.
Figure 10:
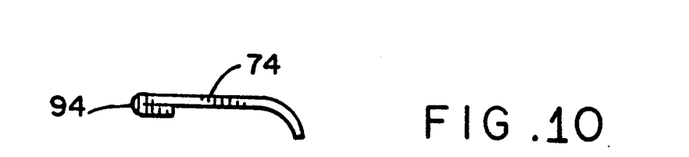
FIG. 10 is a side elevational view of the actuating lever shown in FIG. 9.

The actuating lever 74 is shown in greater detail in FIGS. 9 and 10. As shown in these figures, the foot or pivot end 94 of the lever is bent back on itself to form a smoothly radiused edge. The lever 74 preferably has the shape of a lazy J, as shown in FIG. 10, and a key-hole slot 95 is formed therein opposite the foot end 94. The slot 95 is sized to accept the locking pin 62 and to engage a shoulder 96 carried thereon.

Figure 11:
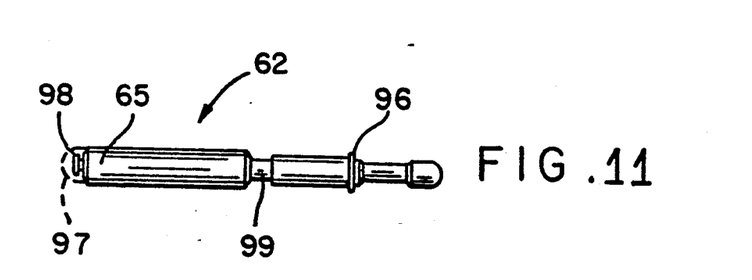
FIG. 11 is a view of the locking pin of the present invention.

The lever abutting shoulder 96 on the locking pin 62 is shown in more detail in FIGS. 4 and 11. As shown in FIG. 4, the spring 63 exerts a biasing force on the upper surface of the shoulder, while the lower surface engages the actuating lever 74. Thus, by depressing pushbutton 70, the actuating lever lifts pin 62 by shoulder 96 against the biasing force of the spring 63. As shown in FIG. 11, the pin is comprised of sections having different radii which impedes the capillary action of liquid therealong. An intermediate portion 99 of the pin 62 is formed with a reduced diameter for insertion into the keyhole slot 95 which captures the pin 62 below the annular shoulder 96. In the preferred embodiment, the tip 65 of the pin 62 is covered with a plastic material which may be secured in place by injection molding a plastic end piece 97 directly on and around a raised button 98.

Referring to FIGS. 2-5, it will be seen that the upper end of each stanchion 24 is formed with a collar portion 100 having an opening therein for receiving an end of the cross bar 26, which is generally oval in cross-section. The cross bar 26 typically includes a relatively thin-walled metal beam portion which may be of either extruded or roll-formed construction and is formed with an upper groove for receiving a resilient insert member which extends along the length of the cross bar 26. A suitable fastener, such as a self-tapping screw is used to secure the cross bar 26 to the collar portion 100 of the stanchion 24.

Figure 2:
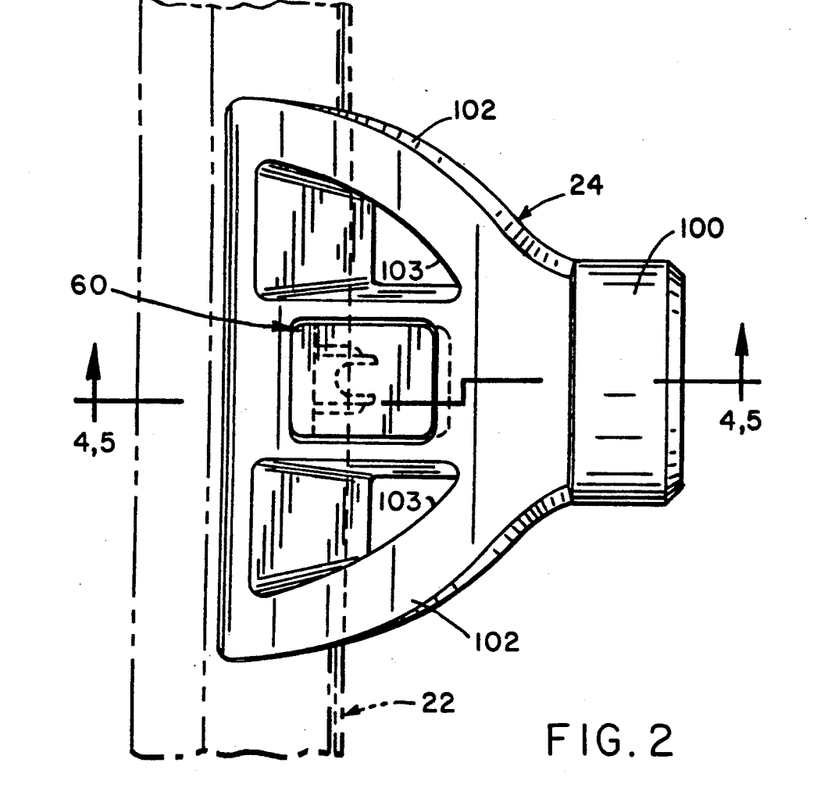
FIG. 2 is a plan view of the article securing member of the present invention as mounted on a side rail of the article carrier of FIG. 1.

In the preferred embodiment, each of the stanchions 24 also includes a pair of downwardly directed legs 102 spaced apart longitudinally with respect to the centrally located push button 70. Thus, as shown in FIG. 2, a pair of article securing openings 103 are formed in the stanchions 23 between the push button 70 and the legs 102. These openings 103 are useful for receiving hooks, ropes or elastic tie down straps for securing articles to the carrier 20.

Referring to FIG. 1, the article securing members 25 are preferably in the form of tie-down elements mounted for longitudinal movement on the side rails 22. Each of the tie-down elements 25 includes an aperture 104 at its upper inner end which is similarly useful for receiving a hook, rope end or an elastic strap for securing articles or luggage in the carrier 20. The retractable pin locking mechanism of the tie down element 25 is generally the same as for the stanchion members 24 although the push buttons may be slightly smaller in size.

The side rails 22 may be made of extruded aluminum or of roll-formed sheet metal, if desired, and the oblong apertures 67 are oriented so that their major axis is in a vertical plane substantially perpendicular to the longitudinal or z axis of the side rail 22 as axis shown in FIG. 1A. It will also be seen and appreciated from FIGS. 1A and 3–5 that the oblong shape of the apertures 67 not only facilitates their fabrication but also permits easy insertion therein of the tip 62 of the lock pin 60 which is preferably disposed substantially perpendicular to the z axis of the rail, but as illustrated may be inclined at an angle relative to the inner surface 35 of the rail. Also as shown in FIG. 1A, two complementary round holes 105, 106 one on the inboard side 35 and one on the upper supporting surface 30 of side rail 22, can be provided as further tie down means. These holes 105, 106 can be sized to accept a rope or the J-end of a bungie cord. End caps 107 similar to those shown in the previously mentioned copending application Ser. No. 250,705 may be provided to close the end of the rails and provide a smooth streamlined appearance thereto.

We claim as our invention:

1. An article carrier for an automotive vehicle having an exterior body surface, comprising in combination,
    at least one elongated member adapted to be mounted on said exterior body surface, said elongated member having a plurality of longitudinally spaced apertures therein,
    an article securing member adapted to be mounted for longitudinal movement on said elongated member,
    said article securing member including means cooperable with said apertures for locking and longitudinally adjusting said article securing member at predetermined positions along said elongated member,
    said locking and adjusting means including a latching member carried by said article securing member and having one end thereof engageable and disengageable with said apertures, an actuating member carried by said article securing member and being depressed and extended linearly relative to an outer surface of said article securing member from a latching position to an unlatching position, and means including a pivotally movable lever link having an elongated body and first and second ends, said elongated body of said lever link extending between and being pivotally connected adjacent each of said first and second ends respectively to said latching member and said actuating member for disengaging said one end of said latching member from said apertures incident to said actuating member being manually moved to said unlatching position causing corresponding relative pivotal movement of said lever link with respect to both said actuating member and said latching member.

2. An article carrier as defined in claim 1 wherein said article securing member is a stanchion adapted to be slidably mounted on said elongated member and to support one end of a crossbar for said article carrier.

3. An article carrier as defined in claim 1 wherein said article securing member is a tie down element adapted to be slidably mounted on said elongated member and includes at least one opening adapted to receive a tie down strap.

4. An article carrier as defined in claim 1 wherein said locking and adjusting means includes spring means for biasing said one end of said latching member into engagement with said apertures.

5. An article carrier as defined in claim 4 wherein said article securing member is formed with an internal socket for receiving one end of said spring means and said latching member is formed with a shoulder intermediate its ends for abutting the other end of said spring means.

6. An article carrier as defined in claim 1 wherein said latching member is in the form of an elongated, generally cylindrical lock pin having at least one annular shoulder formed intermediate the ends thereof and said first end of said lever link is pivotally connected to said pin so as to abut said annular shoulder.

7. An article carrier as defined in claim 6 including spring means for biasing said lock pin into engagement with said apertures, said spring means engaging said annular shoulder on the opposite side thereof from said lever pivotal connection.

8. An article carrier as defined in claim 7 wherein said article securing member includes an outwardly opening recess therein and said actuating member is in the form of a push button disposed in said recess for movement between said latching and unlatching positions.

9. An article carrier as defined in claim 8 wherein said push button is formed with an internal pocket for receiving and supporting said second end of said lever link for pivotal movement incident to said push button being depressed and manually moved to said unlatching position.

10. An article carrier as defined in claim 8 wherein said push button is formed with at least one detent projecting outwardly generally perpendicularly to the axis of the button and recess so as to guide the movement of the button in the recess between said latching and unlatching positions.

11. An article carrier as defined in claim 10 wherein said push button is disposed for sliding movement in said recess and is formed with a pair of detents projecting outwardly generally perpendicularly from the lower slide surface thereof and said recess is formed with a pair of guide grooves for receiving said pair of detents to limit the outward extent of sliding movement of said button relative to said recess.

12. An article carrier as defined in claim 11 wherein said guide grooves define at least partially open bottoms so as to provide drain passageways out of said recess below said push button slide surface.

13. An article carrier as defined in claim 9 wherein said second end of said lever link is formed with a smoothly radiused outer surface, said second end being pivotally connected to and supported by said internal pocket of said push button.

14. An article carrier as defined in claim 13 wherein said second end of said lever link is doubled back on itself to form said smoothly radiused outer surface pivotally connected to and supported by said internal pocket of said push button.

15. An article carrier as defined in claim 9 wherein said first end of said lever link is formed with a generally key-hole shaped opening including a circular hole and a narrow entry slot, said lock pin being formed with a portion of reduced diameter intermediate said annular shoulder and said one end, said entry slot being dimensioned to receive said reduced diameter portion and said circular hole being dimensioned to receive said pin section adjacent said annular shoulder.

16. An article carrier as defined in claim 1 wherein said one end of said latching member is formed with a rounded non-metallic tip.

17. An article carrier as defined in claim 16 wherein said non-metallic tip is made of plastic material injection molded directly on said one end of said latching member.

18. An article carrier as defined in claim 1 wherein said elongated member has a longitudinal axis and said apertures are substantially oblong in shape having a major axis and a minor axis, said major axis oriented substantially perpendicular to said longitudinal axis of said elongated member.

19. An article carrier for an automotive vehicle having an exterior body surface, comprising in combination, a pair of elongated members adapted to be mounted on said exterior body surface in spaced apart, parallel relation, said elongated members having a plurality of longitudinally spaced apertures therein, an article securing member adapted to be mounted for longitudinal movement on each of said elongated members and to support a cross bar therebetween, each of said article securing members including means cooperable with said apertures for locking and longitudinally adjusting said article securing members and said cross bar at predetermined positions along said elongated members, said locking and adjusting means including a lock pin carried by each of said article securing members and having one end thereof engageable and disengageable with said apertures, spring means for biasing said lock pin into engagement with said apertures, a push button movably mounted in each of said article securing members and being manually movable from a latching position to an unlatching position, and means including a pivotally movable lever link having an elongated body and first and second ends, said elongated body of said lever link extending between and being pivotally connected adjacent each of said first and second ends respectively to said lock pin and said push button for disengaging said one end of said lock pin from said apertures against the bias of said spring means incident to said push button being manually moved to said unlatching position causing corresponding relative pivotal movement of said lever link with respect to both said push button and said lock pin.

20. An article carrier as defined in claim 19 wherein said push button is formed with an internal, channel-like pocket for receiving and supporting said second end of said lever link for pivotal movement incident to said push button being manually moved to said unlatching position and said second end of said lever link is formed with a smoothly radiused outer surface, said second end being pivotally connected to and supported by said internal pocket in said push button.

21. An article carrier as defined in claim 20 wherein said lock pin is generally cylindrical in shape and has an annular shoulder formed intermediate the ends thereof, said first end of said lever link is formed with a generally key-hole shaped opening including a circular hole and a narrow entry slot, said lock pin being formed with a portion of reduced diameter intermediate said annular shoulder and said one end, said entry slot being dimensioned to receive said reduced diameter portion and said circular hole being dimensioned to receive said pin section adjacent said annular shoulder which abuts and is pivotally connected to said first end of said lever link.

22. An article carrier as defined in claim 19 wherein said elongated members have a longitudinal axis and said apertures are substantially oblong in shape having a major axis and a minor axis, said major axis oriented substantially perpendicular to said longitudinal axis of said elongated members.

23. An article carrier as defined in claim 22 wherein said lock pin is formed with a rounded non-metallic tip disposed for engagement with said oblong apertures in said elongated members.

24. An article carrier as defined in claim 23 wherein said non-metallic tip is made of plastic material injection molded directly on said one end of said lock pin.

25. An article carrier as defined in claim 21 wherein said article securing member is formed with an internal socket for receiving one end of said spring means and said lock pin is formed with a shoulder intermediate its ends for abutting the other end of said spring means.

26. An article carrier as defined in claim 19 wherein said article securing member includes an outwardly opening recess therein, and said push button is formed with a least one detent projecting outwardly generally perpendicularly to the axis of the button and recess so as to guide the movement of the button in the recess between said latching and unlatching positions.

27. An article carrier as defined in claim 26 wherein said push button is formed with a pair of detents projecting outwardly generally perpendicularly from the lower surface thereof and said recess is formed with a pair of guide grooves for receiving said pair of detents to limit the outward extent of movement of said button relative to said recess.

28. An article carrier as defined in claim 27 wherein said guide grooves define at least partially open bottoms so as to provide drain passageways out of said recess below said push button.

29. An article carrier for an automotive vehicle having an exterior body surface, comprising in combination,     at least one elongated member adapted to be mounted on said exterior body surface, said elongated member having a plurality of longitudinally spaced apertures therein,     an article securing member adapted to be mounted for longitudinal movement on said elongated member,     said article securing member including means cooperable with said apertures for locking and longitudinally adjusting said article securing member at predetermined positions along said elongated member,     said locking and adjusting means including a latching member carried by said article securing member and having one end thereof engageable and disengageable with said apertures,     spring means for biasing said one end of said latching member into engagement with said apertures, said article securing member being formed with an internal socket for receiving one end of said spring means and said latching member being formed with a shoulder intermediate its ends for abutting the other end of said spring means,     an actuating member carried by said article securing member and being depressed and extended linearly relative to an outer surface of said article securing member from a latching position to an unlatching position, and means including pivotal link means having an elongated body and first and second ends, said elongated body of said pivotal link means extending between and being pivotally connected adjacent each of said first and second ends respectively to said latching member and said actuating member for disengaging said one end of said latching member from said apertures incident to said actuating member being manually moved to said unlatching position causing corresponding relative pivotal movement of said pivotal link means with respect to both said actuating member and said latching member.

30. An article carrier as defined in claim 29 wherein said article securing member has an outer surface and includes an outwardly opening recess therein and said actuating member is disposed in said recess for movement between said latching and unlatching positions, said movement of said actuating member being substantially perpendicular to said outer surface of said article securing member.

31. An article carrier as defined in claim 29 wherein said actuating member is formed with an internal, channel-like pocket for receiving and supporting said second end of said pivotal link means incident to said actuating member being manually moved to said unlatching position.

32. An article carrier as defined in claim 29 wherein said apertures are substantially oblong in shape and said one end of said latching member is dimensioned for reception in said oblong apertures.

* * * * *